US012698418B2

(12) United States Patent
Takahashi et al.

(10) Patent No.: US 12,698,418 B2
(45) Date of Patent: Aug. 4, 2026

(54) ADHESIVE COMPOSITION, BONDED BODY AND PRODUCTION METHOD FOR AN ADHESIVE COMPOSITION

(71) Applicant: DENKA COMPANY LIMITED, Tokyo (JP)

(72) Inventors: Yusuke Takahashi, Tokyo (JP); Chiaki Takano, Tokyo (JP); Hiroyuki Kurimura, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 498 days.

(21) Appl. No.: 18/284,506

(22) PCT Filed: Mar. 23, 2022

(86) PCT No.: PCT/JP2022/013513

§ 371 (c)(1),
(2) Date: Sep. 27, 2023

(87) PCT Pub. No.: WO2022/210166

PCT Pub. Date: Oct. 6, 2022

(65) Prior Publication Data

US 2024/0174893 A1 May 30, 2024

(30) Foreign Application Priority Data

Mar. 31, 2021 (JP) ................................ 2021-059627

(51) Int. Cl.

*C09J 4/00* (2006.01)
*C09J 11/06* (2006.01)
*C09J 11/08* (2006.01)
*C09J 151/00* (2006.01)

(52) U.S. Cl.

CPC ................ *C09J 4/00* (2013.01); *C09J 11/06* (2013.01); *C09J 11/08* (2013.01); *C09J 151/003* (2013.01)

(58) Field of Classification Search

CPC ..... C09J 4/00; C09J 11/06; C09J 11/08; C09J 151/003; C09J 4/06; C08F 265/04; C08F 285/00; C08J 3/126; C08K 5/3435; C08L 55/02

See application file for complete search history.

(56) References Cited

U.S. PATENT DOCUMENTS

| | | | | |
|---|---|---|---|---|
| 4,942,201 | A | 7/1990 | Briggs et al. | |
| 5,112,691 | A * | 5/1992 | Briggs | C09J 4/06 428/521 |
| 5,206,288 | A | 4/1993 | Gosiewski et al. | |
| 7,910,636 | B2 | 3/2011 | Barker et al. | |
| 8,235,251 | B2 | 8/2012 | Barker et al. | |
| 8,552,091 | B2 | 10/2013 | Barker et al. | |
| 10,647,889 | B2 | 5/2020 | Miyazaki et al. | |
| 11,390,776 | B2 | 7/2022 | Hajji et al. | |
| 2002/0004132 | A1 * | 1/2002 | Banovetz | C09J 4/06 428/343 |
| 2008/0302479 | A1 | 12/2008 | Barker et al. | |
| 2011/0139819 | A1 | 6/2011 | Barker et al. | |
| 2012/0261071 | A1 | 10/2012 | Barker et al. | |
| 2018/0215954 | A1 | 8/2018 | Miyazaki et al. | |
| 2019/0144724 | A1 | 5/2019 | Dollase et al. | |
| 2020/0216717 | A1 * | 7/2020 | Hajji | C09J 133/04 |
| 2021/0340346 | A1 | 11/2021 | Saruwatari et al. | |
| 2022/0025232 | A1 | 1/2022 | Moritsugu et al. | |
| 2022/0363949 | A1 | 11/2022 | Hajji et al. | |

FOREIGN PATENT DOCUMENTS

| | | | |
|---|---|---|---|
| CN | 103094582 | A | 5/2013 |
| EP | 0 096 447 | A2 | 12/1983 |
| EP | 2624338 | A1 | 8/2013 |
| JP | H04-226579 | A | 8/1992 |
| JP | 2009-519368 | A | 5/2009 |
| JP | 4707320 | B2 | 6/2011 |
| JP | 2016-155892 | A | 9/2016 |
| JP | 6219058 | B2 | 10/2017 |
| JP | 2020-527621 | A | 9/2020 |
| TW | 201805396 | A | 2/2018 |
| TW | 201841754 | A | 12/2018 |
| WO | 2007/046190 | A1 | 4/2007 |
| WO | 2017/170957 | A1 | 10/2017 |
| WO | 2020/054705 | A1 | 3/2020 |
| WO | 2020/110911 | A1 | 6/2020 |

OTHER PUBLICATIONS

Jun. 7, 2022 International Search Report issued in International Patent Application No. PCT/JP2022/013513.

Jul. 2, 2024 Extended Search Report issued in European Patent Application No. 22780381.4.

* cited by examiner

*Primary Examiner* — Doris L Lee
(74) *Attorney, Agent, or Firm* — Oliff PLC

(57) ABSTRACT

An adhesive composition including a polymerizable monomer having a (meth)acryloyl group; a radical polymerization initiator; and a polymer particle having a property of being swollen by an organic solvent, in which in a particle size distribution of secondary particles which are aggregates of the polymer particles, the secondary particles being in the adhesive composition and the particle size distribution being determined by a laser diffraction/scattering method, a proportion of secondary particles having a diameter of 1 μm or more and 200 μm or less is 30% by volume or more.

17 Claims, No Drawings

ADHESIVE COMPOSITION, BONDED BODY AND PRODUCTION METHOD FOR AN ADHESIVE COMPOSITION

TECHNICAL FIELD

The present invention relates to an adhesive composition, a bonded body, and a production method for an adhesive composition.

BACKGROUND ART

An epoxy-based adhesive, an acrylic adhesive, a urethane-based adhesive, and the like are known as adhesive compositions. Among these, an acrylic adhesive is generally excellent in terms of adhesiveness to an oily surface, good workability, and the like.

Examples of the acrylic adhesive include the acrylic adhesive of Patent Document 1. Patent Document 1 describes an acrylic adhesive composition containing (1) a (meth)acrylic acid derivative monomer, (2) a polymerization initiator, (3) a reducing agent, and (4) a diene-based core-shell polymer. In this composition, the diene-based core-shell polymer is an MBS resin (a methyl methacrylate-acrylonitrile-butadiene-styrene copolymer), where the MBS resin is swellable in a (meth)acrylic acid derivative monomer and has a degree of swelling of 9.5 or more in toluene at 25° C.

RELATED DOCUMENT

Patent Document

[Patent Document 1] Japanese Patent No. 4707320

SUMMARY OF THE INVENTION

Technical Problem

As a result of studies, the inventors of the present invention completed an adhesive composition that is improved from the viewpoint of storage stability as compared with the adhesive composition described in Patent Document 1. Specifically, according to the present invention, an adhesive composition from which a desired adhesion strength is obtained even after the passage of time after the production was completed.

Solution to Problem

The inventors of the present invention completed the invention provided below.

According to the present invention, there is provided an adhesive composition including a polymerizable monomer having a (meth)acryloyl group; a radical polymerization initiator; and a polymer particle having a property of being swollen by an organic solvent, in which in a particle size distribution of secondary particles which are aggregates of the polymer particles, the secondary particles being in the adhesive composition and the particle size distribution being determined by a laser diffraction/scattering method, a proportion of secondary particles having a diameter of 1 μm or more and 200 μm or less is 30% by volume or more.

In addition, according to the present invention, there is provided a bonded body including a first structural member; a second structural member; and a cured body of the adhesive composition, which bonds the first structural member and the second structural member.

In addition, according to the present invention, there is provided a production method for an adhesive composition, which is a production method for producing the adhesive composition, the production method including a dispersing step of charging the polymer particles into a container containing the polymerizable monomer and carrying out stirring to disperse the polymer particles in the polymerizable monomer, in which a temperature of the polymerizable monomer at a time of the charging is 0° C. or higher and 40° C. or lower.

Advantageous Effects of Invention

According to the present invention, there is provided an adhesive composition that has good storage stability and from which high adhesion strength is obtained.

DESCRIPTION OF EMBODIMENTS

Hereinafter, embodiments of the present invention will be described in detail.

In the present specification, the description "X to Y" in the description of a numerical value range represents X or more and Y or less unless specified otherwise. For example, "1%, to 5% by mass" means "1% by mass or more and 5% by mass or less".

In the present specification, the using amount preferably represents a total amount of a first agent and a second agent.

In the present specification, the description "group (atomic group)" includes both a group not having a substituent and a group having a substituent unless specified that the group is substituted or unsubstituted. For example, "alkyl group" includes not only an alkyl group not having a substituent (an unsubstituted alkyl group) but also an alkyl group having a substituent (a substituted alkyl group).

The description "(meth)acryl" in the present specification represents a concept including both acryl and methacryl. The same applies to similar description such as "(meth)acrylate".

Unless otherwise specified, the term "organic group" in the present specification means an atomic group obtained by removing one or more hydrogen atoms from an organic compound. For example, the "monovalent organic group" represents an atomic group obtained by removing one hydrogen atom from any organic compound.

<Adhesive Composition>

An adhesive composition according to the present embodiment contains a polymerizable monomer having a (meth)acryloyl group; a radical polymerization initiator; and a polymer particle having a property of being swollen by an organic solvent.

In a particle size distribution of secondary particles which are aggregates of the polymer particles, the secondary particles being in the adhesive composition according to the present embodiment and the particle size distribution being determined by a laser diffraction/scattering method, a proportion of secondary particles having a diameter of 1 μm or more and 200 μm or less is 30% by volume or more, preferably 40% by volume or more, and still more preferably 50% by volume or more. This value may be 100% by volume or may be 99.5% by volume or less.

The inventors of the present invention carried out various studies to improve the storage stability of the adhesive composition. As described above, the inventors of the present invention set the proportion of secondary particles having a diameter of 1 μm or more and 200 μm or less to 30% by volume or more in the particle size distribution of secondary particles which are aggregates of the polymer particles. This made it possible to provide an adhesive composition that has good storage stability and from which high adhesion strength is obtained.

A production method for an adhesive composition according to the present embodiment is not limited; however, from the viewpoint of suitably controlling the particle size distribution of secondary particles, which are aggregates of polymer particles, it is preferable to employ a suitable production method and production conditions. Examples of points of the production method and production conditions include suitably controlling the temperature at the time of mixing a polymerizable monomer and polymer particles, the stirring speed (the circumferential speed of stirring) at the time of mixing, and the like. Details of the production method and production conditions will be described later.

Hereinafter, components that can be contained in the adhesive composition according to the present embodiment, physical properties of the adhesive composition according to the present embodiment, and other matters related to the adhesive composition according to the present embodiment will be described.

(Polymerizable Monomer)

The adhesive composition according to the present embodiment contains a polymerizable monomer having a (meth)acryloyl group. In this specification, the polymerizable monomer having a (meth)acryloyl group is also simply referred to as a "polymerizable monomer".

Specific examples of the polymerizable monomer include the following monomers.

(i) A monomer represented by General Formula Z—O—$R_1$.

In the general formula, Z represents a (meth)acryloyl group, a $CH_2{=}CHCOOCH_2CH_2$— group, a $CH_2{=}C(CH_3)COOCH_2—CH_2CH_2$— group, a $CH_2{=}CHCOOCH_2—CH(OH)$— group, $CH_2{=}C(CH_3)COOCH_2—CH(OH)$— group, a $CH_2{=}CHCOOCH_2—CH(OH)\ CH_2$— group, or a $CH_2{=}C(CH_3)COOCH_2—CH(OH)\ CH_2$— group, and $R_1$ represents hydrogen, an alkyl group having 1 or more and 20 or less carbon atoms, a cycloalkyl group, a benzyl group, a phenyl group, a tetrahydrofurfuryl group, a glycidyl group, a dicyclopentyl group, a dicyclopentenyl group, a (meth) acryloyl group, or an isobornyl group.

Examples of such a monomer include methyl (meth) acrylate, cyclohexyl (meth)acrylate, benzyl (meth)acrylate, tetrahydrofurfuryl (meth)acrylate, dicyclopentyl (meth) acrylate, dicyclopentenyl (meth)acrylate, glycerol (meth) acrylate, glycerol di(meth)acrylate, isobornyl (meth)acrylate, and (meth)acrylic acid.

(ii) A monomer represented by General Formula Z—O—$(R_2O)_p$—$R_1$.

In the general formula, Z and $R_1$ are as described above. $R_2$ represents —$C_2H_4$—, —$C_3H_8$—, —$CH_2CH(CH_3)$—, —$C_4H_8$—, or —$C_6H_{12}$—, p represents an integer of 1 or more and 25 or less.

Examples of such a monomer include 2-hydroxyethyl (meth)acrylate, 2-hydroxypropyl (meth)acrylate, ethoxyethyl (meth)acrylate, polyethylene glycol (meth)acrylate, phenoxyethyl (meth)acrylate, dicyclopentenyloxyethyl (meth)acrylate, and phenoxydiethylene glycol (meth)acrylate.

(iii) A monomer represented by the following general Formula.

[chem. 1]

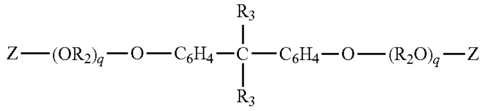

In the general formula, Z and $R_2$ are as described above. $R_3$ represents hydrogen or an alkyl group having 1 or more and 4 or less carbon atoms, and q represents an integer of 0 or more and 8 or less.

A plurality of Z's, $R_2$'s, $R_3$'s, and q's may be respectively the same or different from each other.

Examples of such a monomer include 2, 2-bis (4-(meth)acryloxyphenyl) propane, 2, 2-bis (4-(meth)acryloxyethoxyphenyl)propane, 2, 2-bis (4-(meth)acryloxydiethoxyphenyl) propane, 2,2-bis (4-(meth)acryloxypropoxyphenyl)propane, and 2,2-bis(4-(meth)acryloxytetraethoxyphenyl)propane as well as ethoxylated bisphenol A di(meth)acrylate.

(iv) A (meth)acrylic acid ester of polyhydric alcohol, which is not included in (i), (ii), or (iii) described above.

Examples of such a monomer include trimethylolpropane tri(meth)acrylate, neopentyl glycol di(meth)acrylate, pentaerythritol tetra(meth)acrylate, and dipentaerythritol hexa (meth)acrylate, as well as tripropylene glycol di(meth)acrylate and 1,6-hexanediol di(meth)acrylate.

(v) A urethane prepolymer having a (meth)acryloyloxy group. Such a monomer can be obtained, for example, by reacting a (meth)acrylic acid ester having a hydroxyl group, an organic polyisocyanate, and a polyhydric alcohol.

Examples of the (meth)acrylic acid ester having a hydroxyl group include hydroxyethyl (meth)acrylate, hydroxypropyl (meth)acrylate, and hydroxybutyl (meth) acrylate.

Examples of the organic polyisocyanate include toluene diisocyanate, 4,4-diphenylmethane diisocyanate, hexamethylene diisocyanate, and isophorone diisocyanate.

Examples of the polyhydric alcohol include polyethylene glycol, polypropylene glycol, polytetramethylene glycol, and a polyester polyol.

(vi) An acidic phosphoric acid compound represented by General Formula (I).

[chem. 2]

General Formula (I)

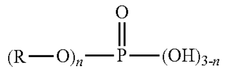

In the formula, R represents a $CH_2{=}CR_4CO(OR_5)_m$— group (where $R_4$ represents hydrogen or a methyl group, $R_5$ represents —$C_2H_4$—, —$C_3H_6$—, —$CH_2CH(CH_3)$—, —$C_4H_8$—, —$C_6H_{12}$—, or —$C_2H_4$—OCO—$C_5H_{10}$—, and m represents an integer of 1 or more and 10 or less), and n represents an integer of 1 or 2.

Examples of the acidic phosphoric acid compound represented by Formula (I) include acid phosphoxyethyl (meth) acrylate, acid phosphoxypropyl (meth)acrylate, bis(2-(meth) acryloyloxyethyl) phosphate, and 2-(meth)acryloyloxyethyl acid phosphate.

Particularly preferred polymerizable monomers (monofunctional and polyfunctional) are as follows:

Monofunctional

Methyl (meth)acrylate, ethylhexyl (meth)acrylate, lauryl (meth)acrylate, ethylene oxide-modified nonylphenol (meth)acrylate, tetrahydrofurfuryl (meth)acrylate, isobornyl (meth)acrylate, benzyl (meth)acrylate, phenoxyethyl (meth) acrylate, dicyclopentenyloxyethyl (meth)acrylate, dicyclopentanyloxyethyl (meth)acrylate, cyclohexyl (meth)acrylate, hydroxyethyl (meth)acrylate, hydroxypropyl (meth) acrylate, and (meth)acrylic acid Polyfunctional Ethylene oxide-modified di(meth)acrylate, trimethylolpropane tri(meth)acrylate, 1,6-hexanediol di(meth)acrylate, polyethylene glycol di(meth)acrylate, ethoxylated bisphenol A di(meth)acrylate, and ethoxylated pentaerythritol tetra (meth)acrylate The adhesive composition according to the present embodiment may contain only one of the monomers (i) to (vi) or may contain two or more thereof. Among these, one or two or more of (i), (ii), and (vi) are preferable in terms of high adhesiveness and low adhesion distortion of the adherend after adhering, and it is more preferable that (i), (ii), and (vi) are used in combination.

In a case where (i) and (ii) are used in combination, the compositional ratio thereof is preferably (i):(ii)=50 to 95:5 to 50, more preferably 60 to 80:20 to 40 in terms of mass ratio. In a case of using (vi), the using amount thereof is preferably 0.05 parts by mass or more and 10 parts by mass or less and more preferably 0.1 parts by mass or more and 5 parts by mass or less with respect to the total of 100 parts by mass of (i) and (ii).

(Radical Polymerization Initiator)

The adhesive composition according to the present embodiment contains a radical polymerization initiator. The polymerizable carbon-carbon double bond of the polymerizable monomer is polymerized by the radical polymerization initiator, which enables the adhesion of the article.

The radical polymerization initiator is preferably a thermal radical polymerization initiator. Preferred examples of the thermal radical polymerization initiator include an organic peroxide. Examples of the organic peroxide include cumene hydroperoxide, para-methane hydroperoxide, tertiary butyl hydroperoxide, diisopropyl benzene dihydroperoxide, methyl ethyl ketone peroxide, tertiary butyl peroxybenzoate, and benzoyl peroxide. Among these, cumene hydroperoxide is preferable in terms of stability.

It is noted that in a case of using a radical polymerization initiator and a reducing agent described later in combination, the curability can be further enhanced or the curing at room temperature can be realized.

The amount of the radical polymerization initiator is preferably 0.1 parts by mass or more and 20 parts by mass or less, and more preferably 0.4 parts by mass or more and 10 parts by mass or less with respect to 100 parts by mass of the polymerizable monomer. In a case of using a suitably large amount of the radical polymerization initiator, the curing speed can be sufficiently increased. On the other hand, in a case of using the radical polymerization initiator so that the amount thereof is not too large, it is possible to further increase storage stability.

(Polymer Particle)

The adhesive composition according to the present embodiment contains polymer particles that have a property of being swollen by an organic solvent. The phrase "swollen by an organic solvent" means that in a case where polymer particles are brought into contact with a liquid such as an organic solvent, the polymer particles have a property of absorbing the liquid and expand. Specifically, the degree of swelling is preferably 5 times or more, more preferably 7 times or more, still more preferably 9.5 times or more, and particularly preferably 10 times or more. The upper limit of the degree of swelling is, for example, 15 times.

The degree of swelling can be measured as described in paragraph 0049 of Patent Document 1 described above. That is, 1 g of a sample is allowed to stand in 100 mL of toluene at 25° C. for 24 hours, and then the gel swollen in toluene is filtered through a 100-mesh wire net (having a mass A). After 1 minute, the mass B of the swollen gel and the wire net is measured, followed by air drying at room temperature for a day and night and then vacuum drying, and the mass C of the dried gel and the wire net is measured. Then, the degree of swelling can be determined according to the following expression: degree of swelling (times)=(B−A)/(C−A).

Since the polymer particle is swellable, it is expected that the polymerizable monomer enters the polymer particle, polymerization occurs in the polymer particle, and as a result, the adhesion strength or the like is further increased.

In the present specification, the polymer particle that has the property of being swollen by an organic solvent is also simply referred to as a "polymer particle".

It should be noted that the various numerical values relating to the particle diameter and the particle size distribution of the polymer particles in this specification indicate numerical values (the particle diameter and the like in a swollen state in a case where the polymer particles are swollen) of the polymer particles in the adhesive composition unless otherwise specified.

From one viewpoint, the polymer particle preferably includes a core-shell type polymer particle. The core-shell type polymer particle can be obtained according to the method described in International Publication No. WO2005/028546, Japanese Unexamined Patent Publication No. 2016-104834, or the like.

From another viewpoint, it is preferable that the polymer particle includes a diene-based polymer, and it is more preferable that a polymer constituting the polymer particle includes a (meth)acrylonitrile-butadiene-styrene copolymer and/or a methyl(meth)acrylate-(meth)acrylonitrile-butadiene-styrene copolymer.

The median diameter $D_{50}$ of the secondary particles determined from the particle size distribution of the secondary particles is preferably 1 μm or more and 200 μm or less, more preferably 5 μm or more and 180 μm or less, still more preferably 10 μm or more and 150 μm or less.

The cumulative 90% diameter $D_{90}$ of the secondary particles determined from the particle size distribution of the secondary particles is preferably 10 μm or more and 500 μm or less, more preferably 20 μm or more and 400 μm or less, and still more preferably 30 μm or more and 300 μm or less.

These numerical values are used to define that the number of coarse secondary particles is relatively small, from a viewpoint different from the fact that the proportion of the above-described secondary particles having a diameter of 1 μm or more and 200 μm or less. In a case of adjusting these numerical values, the performance of the adhesive composition can be further enhanced.

The adjustment of the median diameter $D_{50}$ of the secondary particles and the cumulative 90% diameter $D_9c$ of the secondary particles is carried out, for example, by suitably controlling the temperature at the time of mixing a polymerizable monomer and polymer particles, the shearing force at the time of mixing, and the like. The shearing force is adjusted by appropriately selecting, for example, the rotation speed of the stirring blade, the diameter of the stirring blade, the stirring speed (the circumferential speed of stirring), and the like.

It is noted that the volume average particle diameter of "primary particles" of the polymer particle is preferably 0.01 μm or more and 1 μm or less, more preferably 0.02 μm or more and 0.8 μm or less, and still more preferably 0.03 μm or more and 0.6 μm or less. In a case of suitably selecting the volume average particle diameter of the primary particles, it is also possible to further enhance the performance of the adhesive composition.

For example, in a case of subjecting polymer particles to a pulverization step and a sieve classification step after the pulverization treatment, it is possible to adjust the volume average particle diameter of the "primary particles". In a case of using polymer particles having a suitable particle size distribution, it is also possible to adjust the volume average particle diameter of the "primary particles".

Polymer particles that can be preferably used are available, for example, from Denka Company Limited or KANEKA CORPORATION.

The amount of the polymer particle is preferably 0.1 parts by mass or more and 30 parts by mass or less, and more preferably 1 part by mass or more and 20 parts by mass or less, with respect to 100 parts by mass of the polymerizable monomer. In a case where a suitably large amount of the polymer particle is used, the toughness of a cured film can be further enhanced. On the other hand, in a case where the amount of the polymer particle is not too large, sufficient amounts of the polymerizable monomer and the polymerization initiator can be used, and thus the curability tends to be further enhanced.

(Elastomer)

The adhesive composition according to the present embodiment preferably contains one or more elastomers. It is preferable that the polymer particles described above are excluded from the elastomer. In a case of using an elastomer, the cured body of the adhesive composition has suitable elasticity, and it is possible to achieve, for example, further improvement of toughness.

Examples of the elastomer component include a (meth)acrylonitrile-butadiene-(meth)acrylic acid copolymer, a (meth)acrylonitrile-butadiene-methyl (meth)acrylate copolymer, and a styrene-based thermoplastic elastomer such as a (meth)acrylonitrile-butadiene copolymer, a styrene-butadiene copolymer, chlorosulfonated polyethylene, or a styrene-polybutadiene-styrene-based synthetic rubber, as well as polybutadiene having a (meth)acryl-modified terminals, and a urethane-based elastomer.

Among them, one or more selected from the group consisting of a (meth)acrylonitrile-butadiene-(meth)acrylic acid copolymer and a (meth)acrylonitrile-butadiene copolymer (NBR or the like) is preferable in terms of solubility and adhesiveness.

In a case where an elastomer is used, the amount thereof in terms of the total sum with the polymer particles is preferably 5 parts by mass or more and 40 parts by mass or less, and more preferably 10 parts by mass or more and 30 parts by mass or less, with respect to 100 parts by mass of the polymerizable monomer.

(Reducing Agent)

The adhesive composition according to the present embodiment preferably contains one or more reducing agents. In a case of using a radical polymerization initiator and a reducing agent in combination, the curability can be further enhanced and the curing at room temperature can be realized.

The reducing agent may be any known reducing agent that reacts with a polymerization initiator to generate radicals. The reducing agent is preferably at least one selected from the group consisting of a tertiary amine, a thiourea derivative, and a transition metal salt, and it is more preferably a transition metal salt. Examples of the thiourea derivative include acetyl thiourea and ethylene thiourea. Examples of the transition metal salt include cobalt naphthenate, cobalt octylate, copper naphthenate, and vanadyl acetylacetonate. Among the transition metal salts, vanadyl acetylacetonate is preferable.

In a case where a reducing agent is used, the using amount thereof is preferably 0.01 parts by mass or more and 10 parts by mass or less, and more preferably 0.1 parts by mass or more and 5 parts by mass or less, with respect to 100 parts by mass of the polymerizable monomer. In a case of using an amount of 0.01 parts by mass or more, the curing speed becomes sufficiently high, and in a case of using an amount of 10 parts by mass or less, the storage stability becomes better.

(Paraffin)

The adhesive composition according to the present embodiment may contain paraffin. Specifically, various kinds of paraffin can be used to accelerate the curing of a portion in contact with air. Examples of the paraffin include paraffin wax, microcrystalline wax, carnauba wax, beeswax, lanolin, spermaceti, ceresin, and candelilla wax.

In a case where the adhesive composition according to the present embodiment contains paraffin, it may contain only one paraffin or may contain two or more kinds of paraffin.

In a case where the adhesive composition according to the present embodiment contains paraffin, the amount of the paraffin is preferably 0.01 parts by mass or more and 3 parts by mass or less, and more preferably 0.5 parts by mass or more and 2 parts by mass or less, with respect to 100 parts by mass of the polymerizable monomer. In a case of using a large amount of paraffin to some extent, it is possible to sufficiently obtain the effect of accelerating curing. On the other hand, in a case where the amount of paraffin is not too large, it is possible to obtain the effect of accelerating curing while obtaining sufficient adhesiveness.

(Another Component)

The adhesive composition according to the present embodiment may contain or may not contain optional components other than those described above.

As an example, the adhesive composition according to the present embodiment may contain a spacer (particles) or the like in order to adjust the film thickness during use. The spacer is typically spherical particles made of resin such as polyolefin.

As another example, the adhesive composition according to the present embodiment may contain various stabilizers in order to improve storage stability (suppress deterioration during storage). Examples of the kind of stabilizer include (i) a compound known as a phenol-based antioxidant, (ii) a quinone-based compound, for example, p-benzoquinone or hydroquinone monomethyl ether, (iii) a compound known as a polymerization inhibitor, for example, an amine-based polymerization inhibitor such as phenothiazine, and (iv) a stable radical type compound having a stable radical. Among them, it is desirable to use a stable radical type compound from the viewpoint of improving storage stability without impairing performance as an adhesive (tensile shear adhesion strength and storage elastic modulus).

The stable radical is preferably a nitroxide radical. Specific examples of the stable radical type compound that serves as a nitroxide radical include 1-oxyl-2,2,6,6-tetramethylpiperidine, 4-hydroxy-2,2,6,6-tetramethylpiperidine 1-oxyl, and 4-(meth)acryloyloxy-2,2,6,6-tetramethylpiperidine 1-oxyl. It is preferable to use one or more of these in a case where a stable radical compound is used.

In a case where a stabilizer such as a stable radical type compound is used, the content thereof is, for example, 0.001 parts by mass or more and 1 part by mass or less, preferably 0.001 parts by mass or more and 0.5 parts by mass or less, more preferably 0.01 parts by mass or more and 0.3 parts by mass or less, and still more preferably 0.02 parts by mass or more and 0.1 parts by mass or less, with respect to 100 parts by mass of the polymerizable monomer from the viewpoint of improving the storage stability without impairing the performance as an adhesive.

(One-Agent Type/Two-Agent Type)

The adhesive composition according to the present embodiment may be a so-called one-agent type or may be a two-agent type (an adhesive composition of which two agents filled in separate containers are mixedly used immediately before use).

In a case of the two-agent type, it is preferable that the radical polymerization initiator is contained in the first agent, and the reducing agent is contained in the second agent, respectively. However, a tertiary amine is preferably contained in the first agent, and a thiourea derivative and a transition metal salt are preferably contained in the second agent. Another component can be appropriately mixed in the two agents. It suffices that the first agent and the second agent are used by being mixed just before use.

It is noted that in a case where the adhesive composition according to the present embodiment is a two-agent type, it is preferable that the amounts of respective components in the first agent and the second agent are adjusted so that the adhesive composition after mixing the first agent and the second agent contains the above-described respective components in the ranges of the preferred contents of the components, respectively.

<Production Method for Adhesive Composition>

A production method for an adhesive composition according to the present embodiment is not limited. However, from the viewpoint of suitably controlling the particle size distribution of secondary particles, which are aggregates of the polymer particles, it is preferable to employ a suitable production method and production conditions. Examples of points of the production method and production conditions include suitably controlling the temperature at the time of mixing a polymerizable monomer and polymer particles, the stirring speed at the time of mixing, and the like.

The production method for an adhesive composition according to the present embodiment preferably includes a dispersing step of charging polymer particles into a container containing a polymerizable monomer and carrying out stirring to disperse the polymer particles in the polymerizable monomer. In this dispersing step, the temperature of the polymerizable monomer in the container at the time of charging the polymer particles is preferably 0° C. or higher and 40° C. or lower, and more preferably 15° C. or higher and 35° C. or lower.

In a case where the temperature of the polymerizable monomer is 0° C. or higher at the time of charging the polymer particle, the polymer particles can be easily dispersed in the polymerizable monomer in a shorter time.

In addition, in a case where the temperature of the polymerizable monomer is 40° C. or less at the time of charging, it is difficult for the polymer particles to form a lumped powder (aggregates or lumps), and thus a good polymer dispersion state can be easily obtained.

In the dispersing step, a stirring blade is preferably used to mix a polymerizable monomer and polymer particles. In order to sufficiently disperse the polymer particles uniformly in the polymerizable monomer, the circumferential speed of stirring of the stirring blade is preferably 300 mm/s or more and more preferably 500 mm/s or more. Although there is no particular upper limit on the circumferential speed of stirring, the circumferential speed of stirring is, for example, 300,000 mm/s or less due to restrictions on the facility device.

<Use Application of Adhesive Composition/Bonded Body>

In a case of, for example, coating an article with the adhesive composition according to the present embodiment and curing it, a bonded body containing a cured body of the adhesive composition can be obtained. Specifically, in a case of using the adhesive composition according to the present embodiment, it is possible to obtain a bonded body containing a first structural member, a second structural member, and a cured body of the adhesive composition, which bonds the first structural member and the second structural member.

Particularly in a case of containing a reducing agent, the adhesive composition according to the present embodiment is preferably cured (at room temperature) without heating, whereby an article can be adhered. Of course, carrying out heating is not excluded in a case of obtaining a bonded body.

The embodiments according to the present invention have been described above; however, these are examples according to the present invention, and thus it is possible to adopt various configurations other than the above. In addition, the present invention is not limited to the embodiments described above and modifications, improvements, and the like are included in the present invention in a range in which it is possible to achieve the purpose of the present invention.

EXAMPLES

The embodiment according to the present invention will be described in more detail based on Examples and Comparative Examples. It should be noted that the present invention is not limited to only Examples.

<Production of Adhesive Composition>

An agent A (a first agent) and an agent B (a second agent) of each of Examples and Comparative Examples were respectively produced as follows.

(1) The monomers (unit: part by mass, the same applies to another component) described in "Polymerizable monomer" in the table below and the NBR described in "Elastomer" were put into a temperature-controllable mixing container, and stirring and mixing were carried out at 60° C. for 1 hour using a stirring blade (an anchor blade).

(2) The polymer particles described in "Polymer particle" in the table below were put into the container. The temperature at the time of charging the polymer particles is shown in the table below. Then, mixing was carried out for 1 hour using a stirring blade. The rotation speed of the stirring blade, the diameter of the stirring blade, and the circumferential speed of stirring were set as shown in the table.

(3) The rest of the components were put into the container, and stirring and mixing were further carried out sufficiently at room temperature for 24 hours.

In the table below, those commercially available were appropriately used regarding the polymerizable monomer, the radical polymerization initiator, the reducing agent, and 4-hydroxy-2,2,6,6-tetramethylpiperidine 1-oxyl.

Details of the polymer particle and the elastomer are as follows.

Product 1: A core-shell type particle which is a methyl methacrylate-acrylonitrile-butadiene-styrene copolymer, degree of swelling measured as described in paragraph 0049 of Patent Document 1:14.0

Product 2: A core-shell type particle which is an acrylonitrile-butadiene-styrene copolymer, degree of swelling measured as described in paragraph 0049 of Patent Document 1:10.1

NBR: "230S" manufactured by JSR Corporation (amount of bonded acrylonitrile: 35%, Mooney viscosity: 56)

The structure of ethoxylated bisphenol A dimethacrylate is shown below.

[chem. 3]

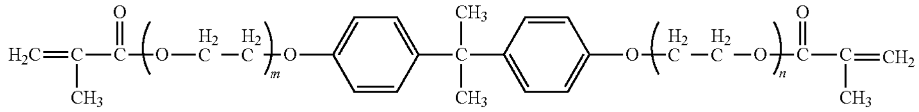

<Measurement of Particle Size Distribution of Polymer Particles in Adhesive Composition>

The measurement was carried out according to the following procedure.

(1) 1 g of the adhesive composition was taken in a 10 mL glass vial, and 4 g of methyl methacrylate (manufactured by Tokyo Chemical Industry Co., Ltd., >99.8%) was added thereto (methyl methacrylate was used to dilute the composition to facilitate the measurement of the particle size distribution).

(2) The lid of the glass vial was closed, and the vial was allowed to stand at 23° C. for 24 hours without shaking. The supernatant was taken with a dropper from the glass vial after standing, and the particle size distribution of the polymer particles contained in this supernatant was measured. Using a laser diffraction particle size distribution analyzer "SALD-2200" manufactured by Shimadzu Corporation, the particle size distribution was measured according to JIS Z 8825: 2013 under the following conditions: measurement temperature: 23° C., and measurement solvent: methyl methacrylate (manufactured by Tokyo Chemical Industry Co., Ltd., >99.8%).

(3) From the measurement results, the followings were determined.

Proportion of secondary particles having a diameter of 1 μm or more and 200 μm or less in particle size distribution of secondary particles Median diameter $D_{50}$ of secondary particles Cumulative 90% diameter $D_{90}$ of secondary particles It is noted that, in general, in the measurement of particle size distribution, ultrasonic dispersion or the like is often carried out in order to reduce secondary particles as few as possible. However, in this example, a dispersion treatment such as ultrasonic dispersion was not carried out, and only a dilution treatment with methyl methacrylate was carried out in order to obtain the information on the particle size distribution which reflects the aggregation state of the polymer particles in the adhesive composition.

<Particle Size Distribution Measurement for Polymer Particles as they are (Primary Particles)>

The measurement was carried out according to the following procedure.

(1) 0.1 g of the polymer particles (the product 1 or the product 2) was taken in a 10 mL glass vial, and 4.9 g of an aqueous solution of sodium hexametaphosphate having a concentration of 0.2, by mass was added thereto, followed by a dispersion treatment for 10 minutes with ultrasonic waves (130 W).

(2) The particle size distribution of the polymer particles contained in this dispersion was measured. Using a laser diffraction particle size distribution analyzer "SALD-2200" manufactured by Shimadzu Corporation, the particle size distribution was measured according to JIS Z 8825: 2013 under the following conditions: measurement temperature: 23° C., and measurement solvent: pure water).

(3) Among the measurement results, the volume average particle diameter of the primary particles of the polymer particles was used.

<Measurement and Evaluation of Viscosity>

Regarding the viscosity of each adhesive composition (the agent A and the agent B), the measurement of viscosity (unit: mPa·s) was carried out according to JIS K 6838 using a B-type viscometer at a rotor rotation speed of 20 rpm, a measurement time of 2 minutes, and a measurement atmosphere temperature of 25° C. This viscosity measurement value was denoted as A1. It is noted that each adhesive composition (the agent A and the agent B) was allowed to stand in an atmosphere of 25° C. for 24 hours or more before measurement, and the liquid temperature was adjusted to 25° C.

Further, a 500 mL polyethylene bottle was filled with 500 g of each adhesive composition (the agent A and the agent B) and the filled polyethylene bottle was allowed to stand at 23° C. for one week. Then, the viscosities of the agent A and the agent B after standing were measured by the same method. This viscosity measurement value was denoted as A2. Then, the viscosity retention rate A (%) was calculated according to the following expression.

$$A\ (\%)=(A2/A1)\times 100$$

In addition, for viscosity, the thixotropic index (TI) was also measured. Specifically, TI was determined by calculating A1'/A1 from the value of A1 and a viscosity A1' measured in the same manner as the measurement of A1, except that the rotation speed was changed from 20 rpm to 2 rpm.

<Evaluation of Adhesion Toughness>

An evaluation was carried out as follows according to JIS K 6854. The evaluation was carried out in an environment of a temperature of 23° C. and a relative humidity of 50%.

First, equal amounts of the agent A and the agent B of the adhesive composition of each Examples and each Comparative Examples were mixed to prepare a mixture thereof. This mixture was quickly applied onto one side of one test piece (200 mm×25 mm×1.6 mm, an SECC steel plate). Immediately after the application, the other test piece (200 mm×25 mm×0.5 mm: an SECC steel plate) was superimposed to be bonded and then fixed with a clip. Then, aging was carried out at room temperature for 24 hours. In this way, a sample for evaluation was obtained.

Using the obtained sample for evaluation, the peel-adhesion strength (peel strength, unit: kN/m) was measured. The peel-adhesion strength (unit: kN/m) was measured at a tensile speed of 50 mm/min under an environment of a temperature of 23° C. and a relative humidity of 50%. The measurement was carried out three times, and the average value is shown in the table as the peel strength. The standard deviation from the triplicate measurements is also shown in the table. Further, the results of observing the state of destruction are also shown in the table. In the state of destruction, the area rate of the destruction type was obtained. Cohesive destruction is preferable in the state of destruction since strong adhesion strength is generally obtained in a case where cohesive destruction occurs.

The above-described various kinds of information are summarized in the following table. The units of the amounts of the polymerizable monomer, the polymer particle, the elastomer, the radical polymerization initiator, the reducing agent, and another component are parts by mass.

TABLE 1

| | | Example 1 | | Example 2 | | Example 3 | |
|---|---|---|---|---|---|---|---|
| | | A agent | B agent | A agent | B agent | A agent | B agent |
| Polymerizable monomer | Methyl methacrylate | 60 | 60 | 60 | 60 | 60 | 60 |
| | 2-hydroxyethyl methacrylate | 20 | 19 | 20 | 19 | 17 | 16 |
| | Dicyclopentenyloxyethyl methacrylate | 20 | 20 | 20 | 20 | 10 | 10 |
| | 2-methacryloyloxyethyl acid phosphate | | 1 | | 1 | | 1 |
| | Methacrylic acid | | | | | 13 | 13 |
| | Ethylhexyl methacrylate | | | | | | |
| | Phenoxyethyl methacrylate | | | | | | |
| | Hydroxypropyl methacrylate | | | | | | |
| | Ethoxylated bisphenol A dimethacrylate | | | | | | |
| Polymer particle | Product 1 | 7 | 7 | 10 | 10 | 10 | 10 |
| | Product 2 | | | | | | |
| Elastomer | NBR | 7 | 7 | 10 | 10 | 10 | 10 |
| Radical polymerization initiator | Cumene hydroperoxide | 5 | | 5 | | 3 | |
| Reducing agent | Vanadyl acetylacetonate | | 0.5 | | | | 0.1 |
| | Acetyl thiourea | | | | 1 | | |
| Another component | 4-hydroxy-2,2,6,6-tetramethylpiperidine 1-oxyl | | | | | | |
| Charging temperature of polymer particle | Temperature: ° C. | 35.1 | 34.2 | 38.1 | 33.7 | 24.1 | 31.3 |
| Dispersion condition for polymer particle | Rotation speed of stirring blade: rpm | 201 | 198 | 180 | 177 | 185 | 186 |
| | Diameter of stirring blade: mm | 80 | 80 | 80 | 80 | 80 | 80 |
| | Circumferential speed of stirring: nm/s | 842 | 829 | 754 | 741 | 775 | 779 |
| Particle size distribution | Proportion of secondary particles having diameter of 1 μm to 200 μm in particle size distribution of secondary particles (unit: % by volume) | 89.2 | 85.3 | 82.1 | 76.9 | 99.2 | 92.8 |
| | Median diameter $D_{50}$ of secondary particles (unit: μm) | 20.5 | 17.7 | 85.0 | 75.1 | 94.3 | 67.6 |
| | Cumulative 90% diameter $D_{90}$ of secondary particles (unit: μm) | 86.5 | 53.0 | 180.7 | 180.2 | 151.4 | 169.5 |
| | Volume average particle diameter of primary particles of polymer particle (value obtained by dispersing polymer particles as they are, unit: μm) | 0.055 | 0.055 | 0.055 | 0.055 | 0.055 | 0.055 |
| Viscosity | Viscosity (23° C., 20 rpm) A1 (mPa · s) immediately after production | 20100 | 21000 | 10400 | 11800 | 15600 | 14600 |
| | Viscosity (23° C., 20 rpm) A2 (mPa · s) after standing for one week at 23° C. | 20900 | 20300 | 10600 | 12100 | 14600 | 13900 |
| | Viscosity retention rate A (%) | 104 | 97 | 102 | 103 | 94 | 95 |
| | Thixotropic index (T.I.) | 3.1 | 3.1 | 3.7 | 3.4 | 2.8 | 2.8 |
| Adhesion toughness | Peel strength: kN/m | 4.7 | | 5.6 | | 5.4 | |
| | Variation: standard deviation of peel strength (measurement: n = 3) | 0.1 | | 0.03 | | 0.06 | |
| | State of destruction | Cohesive destruction: 100% | | Cohesive destruction: 100% | | Cohesive destruction: 100% | |

| | | Example 4 | | Example 5 | | Comparative Example 1 | |
|---|---|---|---|---|---|---|---|
| | | A agent | B agent | A agent | B agent | A agent | B agent |
| Polymerizable monomer | Methyl methacrylate | 30 | 30 | | | 60 | 60 |
| | 2-hydroxyethyl methacrylate | 50 | 49 | | | 2.0 | 19 |
| | Dicyclopentenyloxyethyl methacrylate | | | | | 20 | 20 |
| | 2-methacryloyloxyethyl acid phosphate | | 1 | | | | 1 |
| | Methacrylic acid | | | | | | |
| | Ethylhexyl methacrylate | 20 | 20 | 20 | 20 | | |
| | Phenoxyethyl methacrylate | | | 40 | 40 | | |
| | Hydroxypropyl methacrylate | | | 30 | 30 | | |
| | Ethoxylated bisphenol A dimethacrylate | | | 10 | 10 | | |
| Polymer particle | Product 1 | | | 14 | 14 | 7 | 7 |
| | Product 2 | 6 | 6 | | | | |

TABLE 1-continued

| | | | | | | | |
|---|---|---|---|---|---|---|---|
| Elastomer | NBR | 4 | 4 | 7 | 7 | 7 | 7 |
| Radical polymerization initiator | Cumene hydroperoxide | 5 | | 5 | | 5 | |
| Reducing agent | Vanadyl acetylacetonate | | | | 0.5 | | 0.5 |
| | Acetyl thiourea | | 2.5 | | | | |
| Another component | 4-hydroxy-2,2,6,6-tetramethylpiperidine 1-oxyl | | | 0.05 | | | |
| Charging temperature of polymer particle | Temperature: ° C. | 21.8 | 33.5 | 33.7 | 37.1 | 61.0 | 60.7 |
| Dispersion condition for polymer particle | Rotation speed of stirring blade: rpm | 150 | 140 | 240 | 244 | 50 | 50 |
| | Diameter of stirring blade: mm | 80 | 80 | 80 | 80 | 80 | 80 |
| | Circumferential speed of stirring: nm/s | 628 | 586 | 1005 | 1022 | 209 | 209 |
| Particle size distribution | Proportion of secondary particles having diameter of 1 µm to 200 µm in particle size distribution of secondary particles (unit: % by volume) | 97.5 | 67.5 | 98.7 | 86.4 | 0.0 | 0.0 |
| | Median diameter $D_{50}$ of secondary particles (unit: µm) | 27.1 | 20.4 | 21.5 | 83.3 | 735.9 | 822.2 |
| | Cumulative 90% diameter $D_{90}$ of secondary particles (unit: µm) | 96.0 | 109.0 | 101.8 | 142.9 | 923.2 | 961.6 |
| | Volume average particle diameter of primary particles of polymer particle (value obtained by dispersing polymer particles as they are, unit: µm) | 0.145 | 0.145 | 0.055 | 0.055 | 0.055 | 0.055 |
| Viscosity | Viscosity (23° C., 20 rpm) A1 (mPa · s) immediately after production | 3040 | 3170 | 19600 | 21600 | 19190 | 17260 |
| | Viscosity (23° C., 20 rpm) A2 (mPa · s) after standing for one week at 23° C. | 3010 | 3030 | 19800 | 21500 | 15870 | 10460 |
| | Viscosity retention rate A (%) | 99 | 96 | 101 | 100 | 83 | 61 |
| | Thixotropic index (T.I.) | 2.1 | 2.2 | 4.1 | 4.3 | 2.3 | 1.9 |
| Adhesion toughness | Peel strength: kN/m | 4.7 | | 3.5 | | 2.9 | |
| | Variation: standard deviation of peel strength (measurement: n = 3) | 0.1 | | 0.1 | | 0.3 | |
| | State of destruction | Cohesive destruction: 100% | | Cohesive destruction: 100% | | Cohesive destruction: approximately 60% interface destruction: approximately 40% | |

As shown in the above table, the viscosity retention rate A of the adhesive composition in which the proportion of secondary particles of the polymer particles was 30% by volume or more was almost 100%, where the secondary particles had a diameter of 1 µm or more and 200 µm or less. That is, the storage stability was good.

Further, in a case of using the adhesive composition in which the proportion of secondary particles of the polymer particles was 30% by volume or more, where the secondary particles had a diameter of 1 µm or more and 200 µm or less, the SECC steel plates could be strongly adhered to each other. That is, high adhesion strength could be obtained.

The inventors of the present invention carried out various studies to improve the storage stability of the adhesive composition. Through the studies, it was presumed that in the adhesive composition in the related art such as that described in Patent Document 1, the polymer particles (the diene-based core-shell polymer or the like) excessively aggregate in the composition to form coarse secondary particles, which leads to a decrease in the adhesion strength with the elapse of time. Specifically, the adhesive composition described in Patent Document 1 had the problem that it is preferable to be used quickly after production since the desired adhesion strength may not be obtained with the lapse of time after the production.

Based on this presumption, the inventors of the present invention set, as described above, the proportion of secondary particles having a diameter of 1 µm or more and 200 µm or less to 30% by volume or more in the particle size distribution of secondary particles which are aggregates of the polymer particles. This made it possible to provide an adhesive composition that has good storage stability and from which high adhesion strength is obtained.

In the present specification, the description has been made mainly regarding the "adhesive composition" containing a polymerizable monomer having a (meth)acryloyl group; a radical polymerization initiator; and a polymer particle having a property of being swollen by an organic solvent and having a characteristic particle size distribution of secondary particles, which are aggregates of polymer particles. However, the adhesive composition described in the present specification can also be used in fields other than the adhesive, such as a coating agent and an injection agent. In other words, the adhesive composition described in the present specification can also be used as a composition of which the use application is not limited, a curable composition, and a resin composition.

This application claims priority based on Japanese Patent Application No. 2021-059627 filed on Mar. 31, 2021, and all contents of the disclosure are incorporated herein.

The invention claimed is:

1. An adhesive composition comprising:
a polymerizable monomer having a (meth)acryloyl group;
a radical polymerization initiator; and
a polymer particle having a property of being swollen by an organic solvent,
wherein in a particle size distribution of secondary particles which are aggregates of the polymer particles, the secondary particles being in the adhesive composition and the particle size distribution being determined by a laser diffraction/scattering method, a proportion of secondary particles having a diameter of 1 µm or more and 200 µm or less is 30% by volume or more.

2. The adhesive composition according to claim 1, wherein a median diameter $D_{50}$ of the secondary particles, determined from the particle size distribution of the secondary particles, is 1 µm or more and 200 µm or less.

3. The adhesive composition according to claim 1, wherein a cumulative 90% diameter $D_{90}$ of the secondary particles, determined from the particle size distribution of the secondary particles, is 10 μm or more and 500 μm or less.

4. The adhesive composition according to claim 1, wherein a volume average particle diameter of primary particles of the polymer particle is 0.01 μm or more and 1 μm or less.

5. The adhesive composition according to claim 1, wherein a polymer constituting the polymer particle includes a diene-based polymer.

6. The adhesive composition according to claim 1, wherein a polymer constituting the polymer particle includes a (meth)acrylonitrile-butadiene-styrene copolymer and/or a methyl (meth)acrylate-(meth)acrylonitrile-butadiene-styrene copolymer.

7. The adhesive composition according to claim 1, wherein the polymer particle includes a core-shell type polymer particle.

8. The adhesive composition according to claim 1, further comprising:

an elastomer.

9. The adhesive composition according to claim 1, further comprising:

a reducing agent.

10. The adhesive composition according to claim 9, wherein the adhesive composition is a two-agent type adhesive composition that consists of a first agent and a second agent and is mixedly used immediately before use, and the first agent contains the radical polymerization initiator, and the second agent contains the reducing agent.

11. The adhesive composition according to claim 1, further comprising:

a stable radical type compound having a stable radical.

12. The adhesive composition according to claim 11, wherein the stable radical is a nitroxide radical.

13. The adhesive composition according to claim 11, wherein the stable radical type compound includes at least one selected from the group consisting of 1-oxyl-2,2,6,6-tetramethylpiperidine, 4-hydroxy-2,2,6,6-tetramethylpiperidine 1-oxyl, and 4-(meth)acryloyloxy-2,2,6,6-tetramethylpiperidine 1-oxyl.

14. The adhesive composition according to claim 11, wherein a content of the stable radical type compound is 0.001 parts by mass or more and 0.5 parts by mass or less with respect to 100 parts by mass of the polymerizable monomer.

15. A bonded body comprising:

a first structural member;

a second structural member; and a cured body of the adhesive composition according to claim 1, which bonds the first structural member and the second structural member.

16. A production method for an adhesive composition, which is a production method for producing the adhesive composition according to claim 1, the production method comprising:

a dispersing step of charging the polymer particles into a container containing the polymerizable monomer and carrying out stirring to disperse the polymer particles in the polymerizable monomer, wherein a temperature of the polymerizable monomer at a time of the charging is 0° C. or higher and 40° C. or lower.

17. The production method for an adhesive composition according to claim 16, wherein the stirring is carried out using a stirring blade at a circumferential speed of stirring of 300 mm/s or more.

* * * * *